United States Patent
Barthel et al.

[11] Patent Number: 6,122,686
[45] Date of Patent: Sep. 19, 2000

[54] PROCESSING MODULE FOR A MODULAR AUTOMATION SYSTEM

[75] Inventors: Herbert Barthel, Herzogenaurach; Horst Daar, Erlangen; Hartmut Schuetz, Heroldsbach, all of Germany

[73] Assignee: Siemens Aktiengesellschaft, Munich, Germany

[21] Appl. No.: 08/320,091

[22] Filed: Oct. 7, 1994

[30] Foreign Application Priority Data

Oct. 11, 1993 [EP] European Pat. Off. .............. 93116453

[51] Int. Cl.⁷ ........................................ G06F 13/00
[52] U.S. Cl. ............................. 710/100; 714/11
[58] Field of Search ..................... 395/280, 309, 395/182.09, 182.1; 710/100, 126, 127, 128, 129; 714/11, 12

[56] References Cited

U.S. PATENT DOCUMENTS

| | | | |
|---|---|---|---|
| 3,676,861 | 7/1972 | Ruth | 395/735 |
| 4,365,312 | 12/1982 | Nakano et al. | 364/900 |
| 4,442,504 | 4/1984 | Dummermuth et al. | 364/900 |
| 4,870,564 | 9/1989 | Ketelhut et al. | 364/200 |
| 5,226,152 | 7/1993 | Klug et al. | 395/575 |
| 5,426,774 | 6/1995 | Banerjee et al. | 395/575 |

FOREIGN PATENT DOCUMENTS

| | | |
|---|---|---|
| 0 109 734 | 5/1984 | European Pat. Off. . |
| 0 130 269 | 1/1985 | European Pat. Off. . |
| 34 18 844 | 1/1988 | Germany . |

OTHER PUBLICATIONS

Siemens Energy & Automation, vol. 12, No. 3, May/Jun., 1990, p. 6–7, Richard Fischer: *Fault–Tolerant PLCs Eliminate production Standstill*.

*Primary Examiner*—Ayaz R. Sheikh
*Assistant Examiner*—Xuonk Chung-Trans
*Attorney, Agent, or Firm*—Kenyon & Kenyon

[57] ABSTRACT

The present invention relates to a processing module for a modular automation system, for instance a modular stored-programmable control, in which the automation system includes a central unit and peripheral units such as input/output modules, subordinate to the central unit. The peripheral units can be coupled to each other via a device bus. A processing module comprises a processor, a memory, a blockable bus coupling element which can be coupled to the device bus, and a blockable central unit coupling element which can be coupled to the central unit, all of which are connected to each other via a module bus that is internal in the processing module. The processing module has a communication interface which is connected with the processor. In this way the central unit can be relieved to a considerable extent of communication activity.

4 Claims, 3 Drawing Sheets

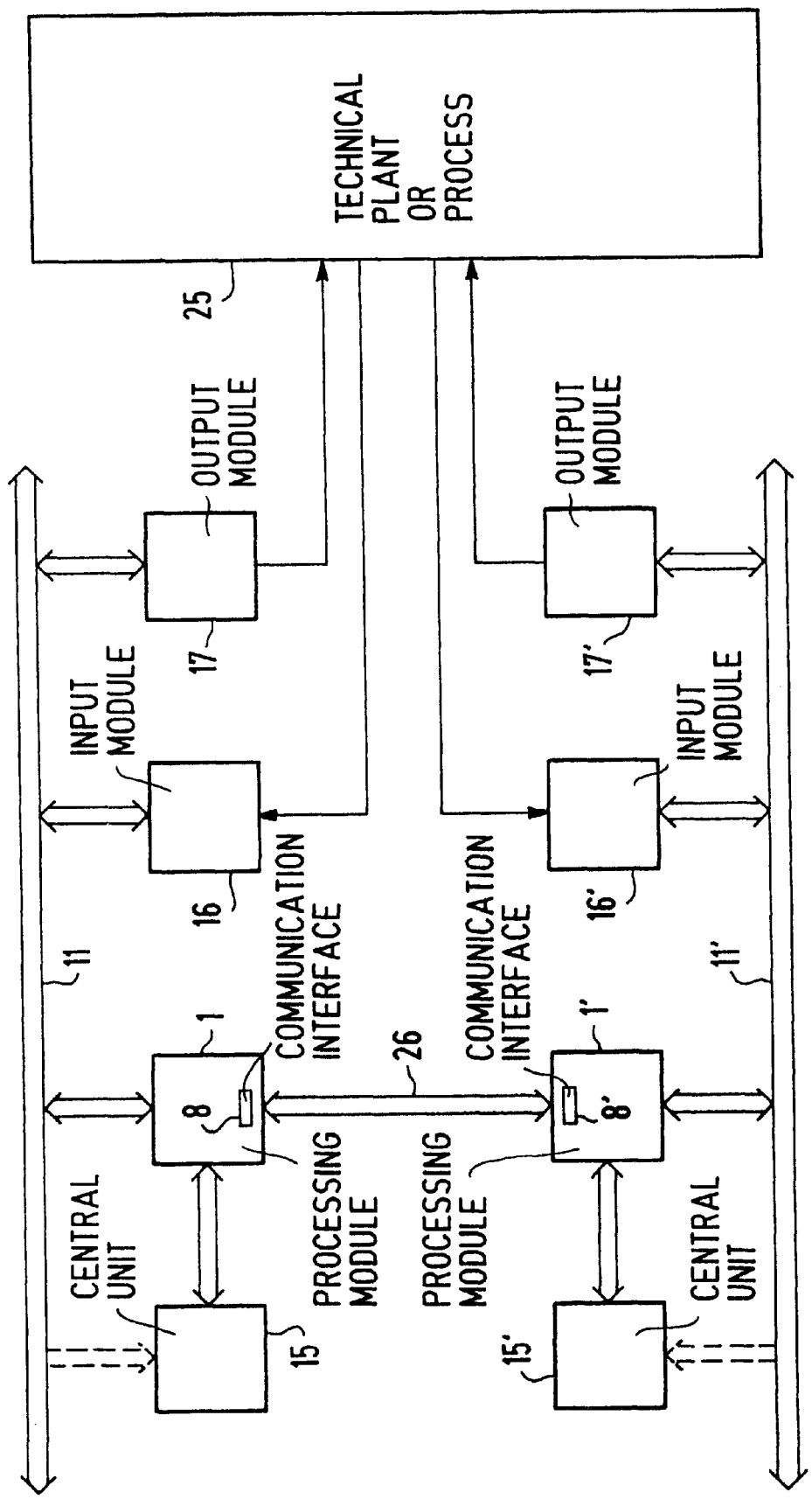

PROCESSING MODULE FOR A MODULAR AUTOMATION SYSTEM

BACKGROUND OF THE INVENTION

The present invention relates to a processing module for a modular automation system, for instance a modular stored-programmable control in which the automation system consists of a central unit and of peripheral units that are subordinate to the central unit, for instance input/output modules, the peripheral units being adapted to be connected to each other via a device bus, the processing module including a processor, a memory, a blockable bus coupling element, and a blockable central coupling element, the processor, the memory and the coupling elements being connected to each other by a module bus that is internal to the processing module, the bus coupling element being adapted to be coupled to the device bus, and the central-unit coupling element being adapted to be coupled to the central unit.

A modular automation system is known, for instance, from Federal Republic of Germany 34 18 844 C2. In that automation system, the central unit, in addition to processing the application program, also carries out a number of other tasks, for instance the testing and the monitoring of the peripheral units connected to the central unit. Thus, the central unit is not available solely for processing the application program. In redundant automation systems, the synchronization and data preparation also take place via the central unit. The capacity of the automation system is thereby negatively affected.

U.S. Pat. No. 4,442,504 discloses a modular automation system in which an interface unit is arranged between the central unit and the peripheral units. It serves, among other things, for monitoring and testing the peripheral units.

SUMMARY OF THE INVENTION

The present invention provides a possibility of relieving the central unit of communication tasks. In particular, in redundant automation system, the central unit is relieved of all tasks which are necessary for the synchronization and data preparation.

The present invention includes a processing module which has at least one communication interface connected to the processor. It is possible, for instance, to connect a control and observation unit to the communication interface. It is also possible for two or more modular automation systems, each of which has a processing module in accordance with the present invention, to communicate with each other via the communication interfaces of the processing modules and therefore, in particular, to synchronize themselves and prepare their data.

If the processing module has a programming interface connected to the processor, the processing module can be programmed completely independently of the central unit.

If the processing module has an alarm interface which is connected to a current supply device for the process control elements, a second disconnect path for the process control elements is present in case of a malfunction.

Further advantages and details will become evident from the following description of an embodiment, read with reference to the drawings and together with the other claims.

BRIEF DESCRIPTION OF THE DRAWINGS

FIG. 3 illustrates shows a redundant automation system incorporating the modular automation system of FIG. 2.

DETAILED DESCRIPTION

Figure 1:
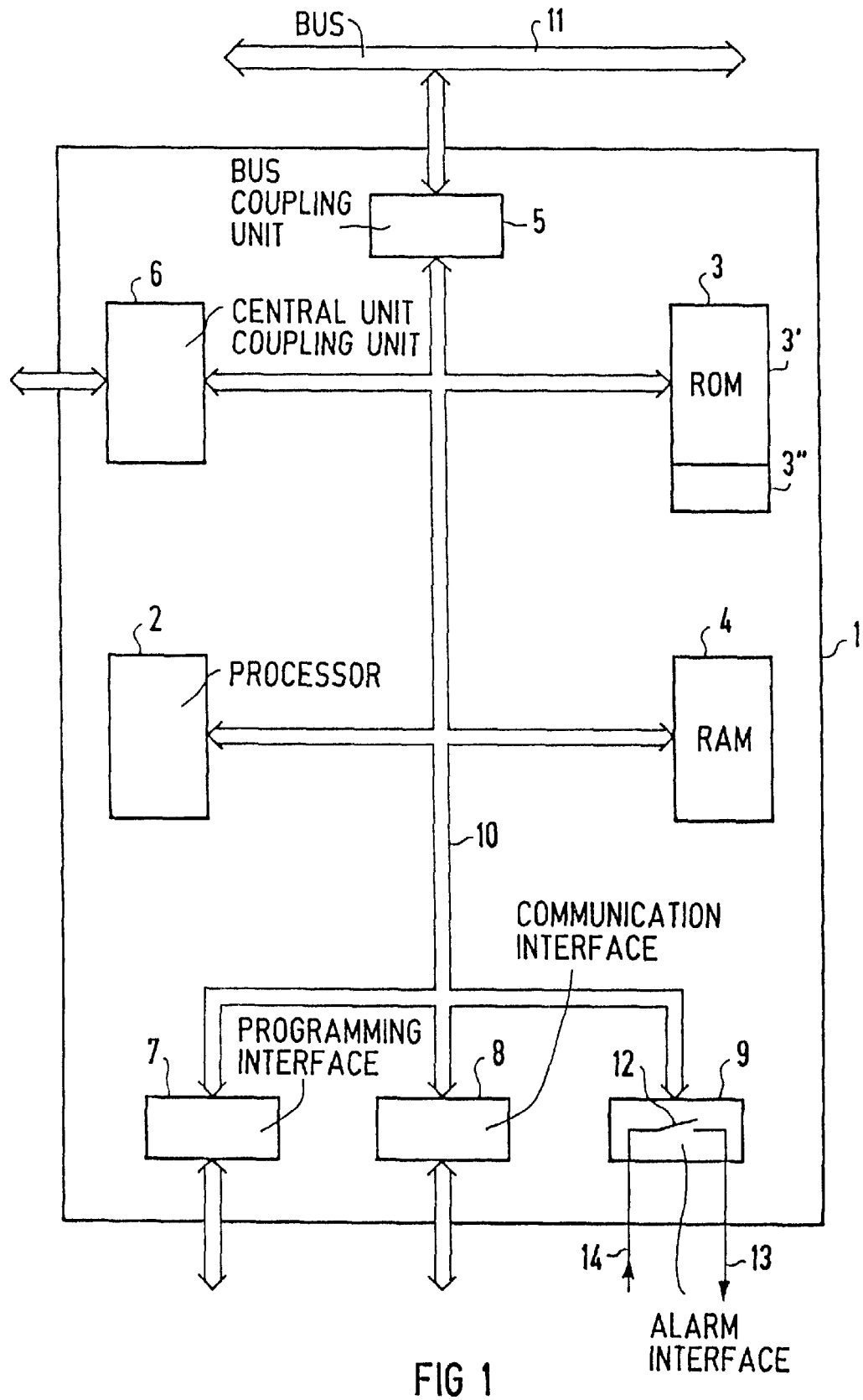
FIG. 1 illustrates shows a processing module according to an embodiment of the present invention.

Referring to FIG. 1, the processing module 1 consists essentially of a processor 2, a ROM memory 3, and a RAM memory 4, as well as the bus coupling element 5 and the central unit coupling element 6. Furthermore, the processing module 1 also has a programming interface 7, a communication interface 8, and an alarm interface 9. The elements 2 to 9 are connected to each other via the module bus 10.

The coupling elements 5, 6 are, for instance, blockable, bidirectional tristate drivers via which the processing module 1 can be connected to the device bus 11 or to a central unit, not shown in FIG. 1. The processor 2 is typically a standard microprocessor, for instance a Siemens 80C167.

The operating system for the processor 2 is stored in the memory region 3' of the ROM 3. The program to be processed at the time by the processor 2 is stored in the RAM 4. Furthermore, values entered via the device bus 11 and values to be sent to the device bus 11, namely the process image, are stored in the RAM 4. Other data are also stored in the RAM.

Via the programming interface 7, a new program can be loaded directly into the RAM 4, and the processor 2 can therefore be reprogrammed. However, it is also possible to program the processing module 1 via the central unit and the central unit coupling element 6. The processing module 1 communicates with other devices, for instance with the processing module of another modular automation system, via the communication interface 8. The alarm interface has, within it, a switch 12 by means of which the output line 13 can be connected with the input line 14, or the output line 13 can be separated from the input line 14. A 24-volt signal is fed to the alarm interface 9 via the input line 14. The importance of the alarm interface 9 will be taken up in more detail below in connection with FIG. 2.

In accordance with FIG. 3, the redundant automation system consists of at least two modular automation systems each of which consists of a central unit 15, 15', a processing module 1, 1', at least one input module 16, 16', and at least one output module 17, 17', The modules 16, 16', 17, 17' are in this connection connected to the processing modules 1, 1' via the device buses 11, 11'. The central units 15, 15' are connected to the processing modules 1, 1'. As indicated in FIG. 3 by the dashed-line arrows to the central units 15, 15', the central units 15, 15' are provided with energy via the device buses 11, 11', but the central units 15, 15' are not connected directly to the device buses 11, 11'. All peripheral-unit accesses take place indirectly via the processing modules 1, 1'. The processing modules 1, 1' could, in this case, load the input signals from the input modules 16, 16', treat these signals, and forward the treated signals to the central units 15, 15'. Conversely, output signals could also be received first from the central units 15, 15', then processed and sent to the output modules 17, 17'.

The automation systems enter signals from the technical process or the technical plant 25 via the input modules 16, 16'. Similarly, the output modules 17, 17' send signals to the technical process or technical plant 25. For the joint guiding of the technical plant 25 by the two automation systems, the processing modules 1, 1' are connected to each other via their communication interfaces 8, 8' and the communication system 26, in this case a single communication line. In the present case, both the synchronization and the data treatment, namely the evaluation of the several input signals based on predetermined design rules, etc., take place via the processing modules 1, 1'. The rest of the entire communication between the modular automation systems, for instance the updating of one of the systems by the other system also takes place via the processing module 1, 1'.

The data treatment can consist, for instance, in multiple input signals from the processing modules 1, 1' being read-in and, if there is a difference between the signals making a given value, for instance the majority result of three signal transmitters, is made available to the central units 15, 15' on the basis of predetermined design rules. In an analogous manner, multiple output signals can, of course, also be sent to the output modules.

The action of the processing modules 1, 1' remains concealed from the central units 15, 15', i.e., the central units 15, 15' do not note, for instance, that the processing modules 1, 1' are making a majority value available as input signal. This input signal is merely sent to the central units 15, 15'.

An inputting and outputting as well as the treatment of data by the processing modules 1, 1' can take place parallel to the running of the application programs by the central units 15, 15'. Data transmissions between the central unit 15, 15' and the processing modules 1, 1' also take place considerably faster than accesses to the device buses 11, 11'. As a result, the cycle time of the automation system, i.e., the time which the central units 15, 15' require for a single run of the application program, and thus the system reaction time can be considerably reduced.

Figure 2:
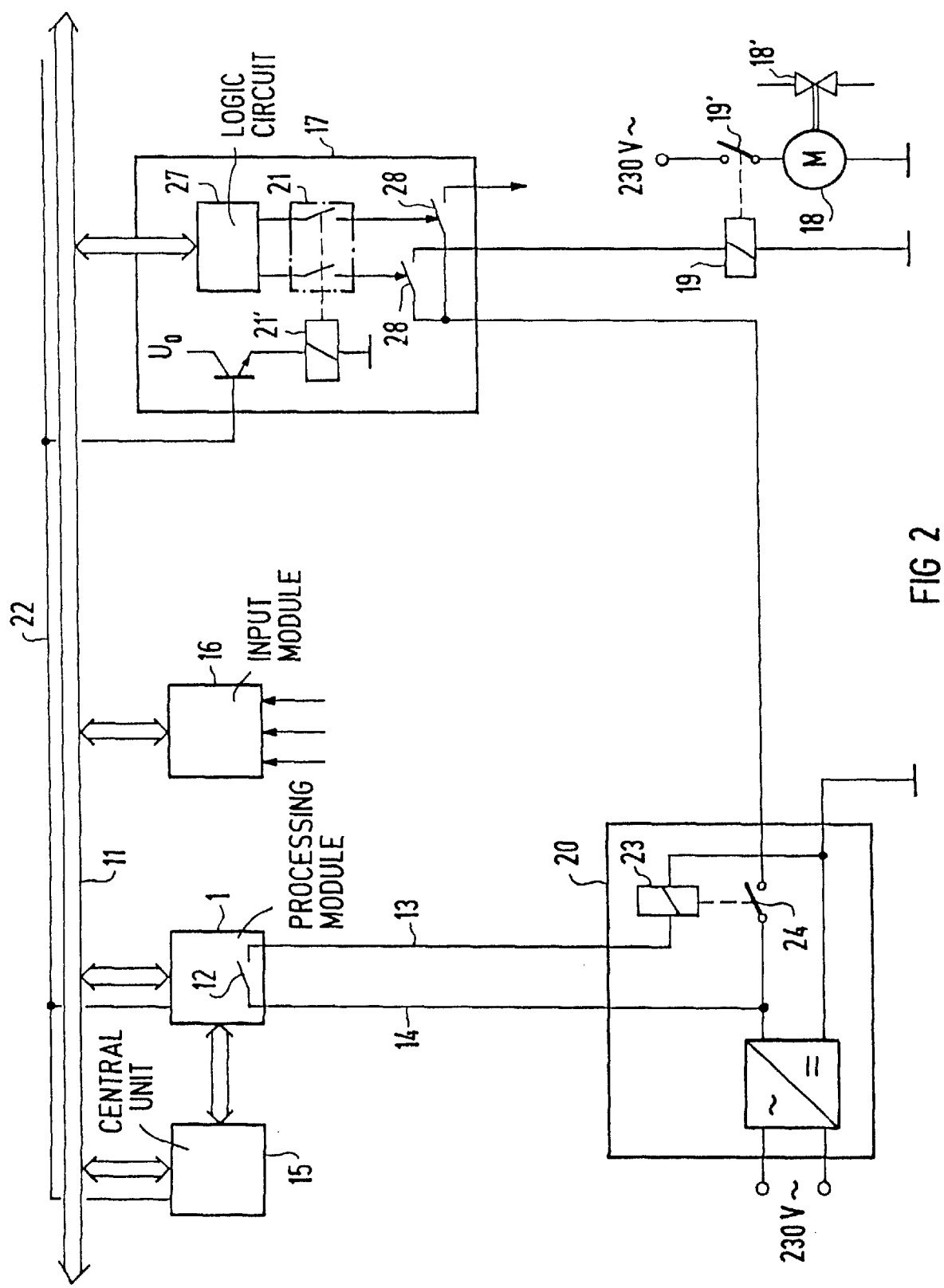
FIG. 2 illustrates a modular automation system incorporating the processing module of FIG. 1.

FIG. 2 shows one of the partial systems of FIG. 3. In the present case, the modular automation system is developed as modular stored-programmable control. It consists of the central unit 15, the processing module 1, at least one input module 16 and at least one output module 17, which are connected to each other via the device bus 11.

Input signals from the technical process or technical plant (not shown in FIG. 2) can be fed to the stored-programmable control via the input module 16. Output signals can be sent via the output module 17 to process control members such as, for instance, the motor 18, which controls a valve 18'.

For the outputting of the output signals, the signals to be sent out are pre-established by the central unit 15 for the logic circuit 27 of the output module 17. The logic circuit 27 thereupon controls each switch 28 in accordance with the signal to be sent out which is associated with it. In this way, the relay 19 is or is not energized and, accordingly, the switch 19' is or is not closed.

All switches 28 of the output module 17 are provided with energy via the current supply device 20. In order, if necessary, to assure a disconnecting of all process control elements, the output module 17 has a switch group 21. The switches of this switch group 21 are opened by the release of the relay 21' when the output module 17 receives a blocking signal from the central unit 15 via the control line 22. The switch group 21 then disconnects all outputs of the output module 17 from the logic circuit 27.

In case of a malfunction of one of the individual systems of the redundant automation system, this is noted by the processing modules 1, 1' and reacted to accordingly. The reaction can consist, for instance, in the defective individual system being disconnected. As a rule, this is effected, as mentioned above, by the sending of the blocking signal over the control line 22. In order to increase the reliability of the automation system, the switch 12 can furthermore be opened by the processing module 1. As a result, the relay 23 is released, so that the switch 24 opens. As a result, the current-supply device 20 is disconnected from the outputs of the output module 17. Accordingly, a second disconnect path, which is completely independent of the disconnection via the control line and the switch group 21, is available for the outputs.

By the use of the processing modules 1, 1' of the invention, the central units 15, 15' are relieved of the synchronization and data treatment in the case of redundant automation systems. Identical central units can also be optionally used in the case of redundant or non-redundant automation systems. In addition, a second disconnect path for the peripheral equipment can be made available, and the reliability of the system thereby increased.

In conclusion, it may also be mentioned that the processing module 1 can, of course, form both a separate module and a single unit with the central unit 15.

What is claimed is:

1. A redundant automation system comprising, two modular automation systems; each comprising:
   a central unit;
   a plurality of peripheral units;
   a device bus coupling said plurality of peripheral units;
   a processing module, including,
      a processor,
      a memory,
      a blockable bus coupling element coupled to said device bus,
      a blockable central unit coupling element,
      a communication interface, and
      a module bus connecting the processor, the memory, the coupling elements and the communication interface; and
   a communication system coupling the communication interfaces of the processing modules of the respective modular automation systems.

2. The system of claim 1, wherein at least one of the processing modules includes a programming interface which can be connected to its processor, via said module bus.

3. The system of claim 2, wherein at least one of the processing modules includes an alarm interface that is connected to its processor via said module bus.

4. The system of claim 1, wherein at least one of the processing modules includes an alarm interface that is connected to its processor via said module bus.

* * * * *